Patented Dec. 20, 1932

1,891,449

UNITED STATES PATENT OFFICE

WILLIAM L. RINTELMAN, OF MILWAUKEE, AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

PREPARATION OF DIARYL-1,2,5,6-ANTHRAQUINONE-DITHIAZOLE BODIES

No Drawing.   Application filed April 20, 1931.  Serial No. 531,636.

This invention relates to the preparation of diaryl-1,2,5,6-anthraquinone-dithiazole bodies.

By the term "diaryl-1,2,5,6-anthraquinone-dithiazole bodies" we mean to include both the thiazole and thiazoline forms, as well as mixtures of the two forms. These compounds are valuable vat dyestuffs, and their preparation has heretofore been effected by condensing 1,5-dimercapto-2,6-diamino-anthraquinone with aromatic aldehydes and like bodies in an organic solvent, such as pyridine, nitrobenzene, or naphthalene. (See U. S. Patents Nos. 1,090,621 and 1,095,731.)

We have now found that the above condensation can be effected more economically in inorganic media such as water or sulfuric acid whether dilute, concentrated or fuming. This effect is particularly surprising in the case of water or dilute sulfuric acid, since the reactants are not soluble in these media. The economy of the process is at once apparent because it does not involve the use of costly organic media with the attendant fire hazard and solvent recovery problems.

We have further found that where water or dilute sulfuric acid is used as the suspending medium, the dyestuff does not always form directly, but is produced first in what appears to be a dihydro or leuco form, which however, can be readily converted into the dyestuff by treatment with mild oxidizing agents, such as sodium hypochlorite, sodium perborate, or a current of air.

Where concentrated or fuming sulfuric acid is used as the solvent medium, the intermediate compound is oxidized in situ by the concentrated sulfuric acid, and the dyestuff is obtained directly in final form. Thus there is an advantage in selecting concentrated or fuming sulfuric acid as the solvent medium, since it saves the extra step of oxidation.

Another advantage of the use of concentrated or fuming sulfuric acid is that by carefully diluting the reaction mass until the sulfuric acid concentration drops to about 85%, the dyestuff precipitates in a highly pure form producing brilliant, greenish yellow dyeings upon cotton, as disclosed more fully in the copending application of William L. Rintelman, Serial No. 531,635, filed of even date herewith.

Instead of reacting upon 1,5-dimercapto-2,6-diamino-anthraquinone, we may use the corresponding sulfide derivative obtainable by mild oxidation of the dimercaptan as disclosed more fully in the copending application of William L. Rintelman, filed of even date herewith, Serial No. 531,633.

As disclosed in Serial No. 531,633 the sulfide derivative is of unknown composition but is known to contain sulfide groups. The mild oxidizing agents such as for example air, sodium perborate and the like apparently act on the mercapto groups to yield sulfides or polysulfides.

Without limiting our invention to any particular procedure, the following examples in which parts by weight are given, will serve to illustrate our method in its preferred form.

Example 1.—10 parts of 1,5-dimercapto-2,6-diamino-anthraquinone are suspended in 400 parts of water, and 10 parts of benzaldehyde are added. The mass is heated in an autoclave to 130–135° C., and maintained at this temperature for about 18 hours. It is now cooled, filtered, and the resulting greenish yellow precipitate is washed with 400 parts of water and dried. It constitutes a 1,2,5,6-anthraquinone-diphenyl-dithiazole body in good yield.

Example 2.—10 parts of the 1,5-sulfide derivative of 2,6-diamino-anthraquinone, obtained, for instance, by passing a current of air through an aqueous alkaline solution of the sodium salt of 1,5-dimercapto-2,6-diamino-anthraquinone, as is more fully described in the Rintelman copending application Serial No. 531,633, are suspended in 200 parts of 50% sulfuric acid. 7.5 parts of benzaldehyde are added and the mass is heated with agitation at 110° C. under a reflux condenser for about 8 hours. It is now cooled, and a current of air is passed through the mass for a period of about 4 hours. The mass is next filtered and the filter cake washed acid free. The paste thus obtained may be purified somewhat by treating with a hot dilute solution of sodium hypochlorite. Upon drying, the dithiazole body is obtained in nearly a quantitative yield.

*Example 3.*—10 parts of the sulfide derivative described in Example 2 are dissolved in 200 parts of sulfuric acid monohydrate, and the temperature is adjusted to about 35 to 45° C. 7.5 parts of benzaldehyde are now added and the reaction mass is stirred at about 35–45° C. for a period of about 20 hours. If desired, the temperature may be raised to about 70° C. at which temperature the reaction proceeds much faster. When the reaction is substantially complete, the mass is diluted with water to a sulfuric acid concentration of about 85%, cooled to room temperature, and the greenish yellow crystals which separate are filtered off, and washed first with 85% sulfuric acid and then with water. Optionally, the entire mass may be drowned in 2000 parts of water, filtered and washed.

The dyestuff thus obtained constitutes a 1,2,5,6-anthraquinone-diphenyl-dithiazole body in a state of high purity. Its dyeings upon cotton from a vat, produced in the ordinary manner, exhibit great brilliance and purity of shade.

*Example 4.*—10 parts of the 1,5-sulfide derivative of 2,6-diamino-anthraquinone, obtainable as in Example 2, are dissolved in 200 parts of 7% oleum at room temperature. 8 parts of benzaldehyde are then added, and the mass is stirred for 1 hour at about 25–30° C., then gradually heated during a period of about 1 hour to 70° C. and maintained at this temperature for about 2 hours. The mass is now cooled to about 25–35° C. and 37 parts of water are gradually dropped in over a period of 5 hours. The mass is then stirred at about 25 to 30° C. for about 6 hours, and the resulting greenish-yellow crystals are filtered off and washed with 100 parts of 83% sulfuric acid. The filter cake is now sludged up with 800 parts of cold water, filtered, and washed with cold water until free of acid. Upon drying and grinding the dyestuff (a 1,2,5,6-anthraquinone-diphenyl-dithiazole body) is obtained in a state of high purity. Optionally, the condensation mass may be drowned in 2000 parts of water, filtered and washed.

*Example 5.*—10 parts of the 1,5-sulfide derivative of 2,6-diamino-anthraquinone as described in Example 2 are dissolved in 200 parts of sulfuric acid monohydrate. 10 parts of ortho-chloro-benzaldehyde are then added. The mixture is next heated to about 70° C., and held at this temperature until the reaction is completed (about 2 hours). The mixture is now cooled, poured into water, filtered and washed acid free. It is then stirred for several hours with 20 parts of a hot 10% solution of sodium hypochlorite to oxidize the impurities, and finally filtered again with water until free of hypochlorite. The dyestuff is obtained in the form of a yellow paste which forms a reddish violet vat and dyes cotton greenish yellow shades. Its composition most probably corresponds to 1,2,5,6-anthraquinone-di (ortho-chlorophenyl)-dithiazole or the corresponding dithiazoline.

*Example 6.*—10 parts of the sulfide derivative described in Example 2 are suspended in 250 parts of water and 5 parts of sodium hydroxide are added. 20 parts of benzaldehyde are then introduced, and the suspension is boiled under a reflux condenser for a period of about 18 hours. The suspended matter gradually dissolves, imparting to the solution a violet color. After prolonged boiling the dyestuff separates out as a yellow suspension which may be filtered and washed as in Example 1. It dyes cotton from a reddish-violet vat in yellow shades, and is apparently identical with the product obtained in Example 1.

The above example points out that an inert or indifferent solute such as sodium hydroxide and the like may be added to the suspending medium (in this case water) without altering the course of reaction.

In the claims it should be understood that by the term "1,5-dimercapto-2,6-diamino-anthraquinone body" we desire to include and cover both the mercaptan itself or derivatives thereof, such as its salts and the sulfide body obtainable therefrom.

We are aware that numerous details of the process may be varied through a wide range without departing from the principles of this invention, and we, therefore, do not purpose limiting the patent granted hereon otherwise than necessitated by the prior art.

We claim as our invention:

1. In the process of preparing diphenyl-1,2,5,6-anthraquinone-dithiazole bodies by condensing a 1,5-dimercapto-2,6-diamino-anthraquinone body with an aryl aldehyde of the benzene series, the improvement which comprises effecting the condensation reaction in a medium selected from the group consisting of water, sulfuric acid, oleum and mixtures thereof.

2. In the process of preparing diphenyl-1,2,5,6-anthraquinone-dithiazole by condensing a 1,5-dimercapto-2,6-diamino-anthraquinone body with benzaldehyde, the improvement which comprises effecting the condensation reaction in a medium selected from the group consisting of water, sulfuric acid, oleum and mixtures thereof, and oxidizing the intermediately formed leuco body.

3. In the process of preparing diphenyl-1,2,5,6-anthraquinone-dithiazole by condensing a 1,5-dimercapto-2,6-diamino-anthraquinone body with benzaldehyde, the improvement which comprises effecting the condensation reaction in a medium containing sulfuric acid.

4. In the process of preparing diphenyl-1,2,5,6-anthraquinone-dithiazole by condensing a 1,5-dimercapto-2,6-diamino-anthraquinone body with benzaldehyde, the improvement which comprises effecting the condensation reaction in concentrated sulfuric acid.

5. In the process of preparing diphenyl-1,2,5,6-anthraquinone-dithiazole by condensing a 1,5-dimercapto-2,6-diamino-anthraquinone body with benzaldehyde, the improvement which comprises effecting the condensation reaction in oleum.

6. In the process of preparing diaryl-1,2,5,6-anthraquinone-dithiazole bodies by condensing a 1,5-dimercapto-2,6-diamino-anthraquinone body with a body having the following formula:

wherein R stands for an aromatic carbocyclic ring, X stands for a hydrogen or halogen atom and Y stands for oxygen or two halogen atoms, the improvement which comprises effecting the condensation reaction in a medium selected from the group consisting of water, sulfuric acid, oleum and mixtures thereof.

7. In the process of preparing a diaryl-1,2,5,6-anthraquinone-dithiazole body by mildly oxidizing a 1,5-dimercapto-2,6-diamino-anthraquinone body and condensing the 1,5 sulfide derivative of 2,6-diamino-anthraquinone formed with a body having the following formula:

wherein R stands for an aromatic carbocyclic ring, X stands for a hydrogen or halogen atom and Y stands for oxygen or two halogen atoms, the improvement which comprises effecting the condensation reaction in a medium selected from the group consisting of water, sulfuric acid, oleum and mixtures thereof.

In testimony whereof, we have hereunto subscribed our names at Carrollville, Milwaukee County, Wisconsin.

WILLIAM L. RINTELMAN.
ROBERT J. GOODRICH.